United States Patent [19]

Garrett

[11] 4,171,560

[45] Oct. 23, 1979

[54] METHOD OF ASSEMBLING A WEAR SLEEVE ON A DRILL PIPE ASSEMBLY

[75] Inventor: William R. Garrett, Houston, Tex.

[73] Assignee: Smith International, Inc., Newport Beach, Calif.

[21] Appl. No.: 904,902

[22] Filed: May 11, 1978

Related U.S. Application Data

[62] Division of Ser. No. 818,672, Jul. 25, 1977, Pat. No. 4,146,060.

[51] Int. Cl.$^2$ .................. B21D 39/00; B23P 19/04
[52] U.S. Cl. ..................... 29/455 R; 29/460; 228/175; 228/176; 264/262
[58] Field of Search ............ 29/460, 455 R; 308/4 A; 264/262, 269; 228/175, 176; 175/320, 325

[56] References Cited

U.S. PATENT DOCUMENTS

| | | | |
|---|---|---|---|
| 1,764,769 | 6/1930 | Woods | 29/460 UX |
| 1,888,588 | 11/1932 | Edwards | 308/4 A |
| 2,002,893 | 5/1935 | Halt et al. | 308/4 A |
| 2,259,023 | 10/1941 | Clark | 29/460 UX |
| 2,295,873 | 9/1942 | Stone | 29/460 UX |
| 2,318,878 | 5/1943 | Miller | 308/4 A |
| 2,845,657 | 8/1958 | Beare | 264/262 |
| 3,491,182 | 1/1970 | Hunder et al. | 264/262 |
| 3,637,033 | 1/1972 | Mayall | 175/320 |
| 3,667,817 | 6/1972 | Kellner | 308/4 A |
| 3,697,141 | 10/1972 | Garrett | 308/4 A |
| 3,948,575 | 4/1976 | Rosser | 308/4 A |

Primary Examiner—Charlie T. Moon
Attorney, Agent, or Firm—Murray Robinson; Ned L. Conley; David Alan Rose

[57] ABSTRACT

A steel wear belt having a prepared inner surface with an inner diameter large enough to pass over the weld upset on one end of a drill pipe tube but too small to pass over the tool joints is installed about the pipe over a prepared outer peripheral surface thereof. The belt is installed prior to one or both tool joints being welded to the tube. The belt is secured to the tube by injection molding a mounting layer of high polymer material, e.g. plastics or elastomer, preferably self bonding and thermo-set, between the prepared surfaces. There is employed a diametrally split mold disposed about the belt and wedged together by tapered end rings. The rings have inner diameters large enough so they can be removed by passing over the tool joints if they are attached to the ends of the tube before securement of the wear belt. The pipe is plastics coated internally from tool joint to tool joint. The plastics of the internal coating and the polymer of the wear belt mounting are cured. Preferably both coating and mounting are cured simultaneously at the same cure cycle times and temperatures. To that tend the pipe coating and belt mounting may both be made of phenolic or epoxy, or preferably, phenolic-epoxy synthetic resin. Independent of that end, an elastomer would be preferred for the belt mounting.

11 Claims, 8 Drawing Figures

METHOD OF ASSEMBLING A WEAR SLEEVE ON A DRILL PIPE ASSEMBLY

This is a division of application Ser. No. 818,672, filed July 25, 1977, now U.S. Pat. No. 4,146,060.

BACKGROUND OF THE INVENTION

This invention relates to earth boring by the rotary system as it is employed typically in drilling petroleum wells. More particularly the invention relates to a drill pipe comprising a tube having tool joints welded to its ends and a wear belt about the tube between its ends, and to method of making such a drill pipe.

For a discussion of the problems encountered in attaching a wear belt to a drill pipe, reference may be made to prior U.S. Pat. No. 3,697,141 —Garrett.

Among the difficulties with prior art wear belts may be mentioned the inability of rubber jackets to last very long in open hole because of cutting, the injurious effect of metal sleeves applied directly to drill pipe because of stress concentration, the expense of assembling and welding more complex structures, and the tendency of some wear belts to become knocked loose or twisted loose upon the drill pipe and slide therealong from the middle of the pipe toward a tool joint at one end of the pipe where the belt has reduced utility. It is an object of the invention to overcome the aforementioned problems and to provide at minimum expense a drill pipe incorporating a long lasting, well secured wear belt.

Snap On Rubber Jackets

Tubular rubber jackets have been placed about lengths of drill pipe to protect casing from wear by the drill pipe and to protect the pipe from wear by the casing or open hole. Typically the jacket is stretched to allow it to be placed on the pipe and to hold it in place thereon. Examples of such construction and various modifications thereof are discussed or disclosed by U.S. Pat. No. 1,907,012—Smith (embedded coil spring), U.S. Pat. No. 2,002,892—Holt (embedded metal sleeve), U.S. Pat. No. 3,063,760—Gifford (jacket secured to pipe with an epoxy or phenolicor other catalyst cured resin injected with a needle, so rubber need not be stretched so much after passing over tool joint.), U.S. Pat. No. 3,480,094—Morris (jacket bonded or mechanically affixed to pipe and externally studded with ceramic), U.S. Pat. No. 3,588,199—Hopmans (second rubber jacket around inner one).

A difficulty with snap on rubber jackets lies in the fact that the rubber is under hoop tension so that slight cuts tend to tear open.

Wrap Around Rubber Jackets

In other cases the entire protector is split so it can be wrapped around the drill pipe and then secured in place, as shown by U.S. Pat. No. 1,938,822—Ferlin (internal wedges too), U.S. Pat. No. 1,994,819—Hartson, U.S. Pat. No. 2,197,531—Smith, U.S. Pat. No. 2,251,428—Smith, U.S. Pat. No. 2,628,134—Williams et al, U.S. Pat. No. 2,636,787—Medearis (casing protector), U.S. Pat. No. 2,959,453—Jacobs, U.S. Pat. No. 3,397,017—Grant et al (split into two halves), U.S. Pat. No. 3,410,613—Knus (split into two halves), U.S. Pat. No. 3,425,757—Minor, U.S. Pat. No. 3,449,022—Minor, U.S. Pat. No. 3,484,141—Collett (axially staggered halves made of plastics), U.S. Pat. No. 3,709,569—Napper.

A difficulty with wrap around rubber jackets lies in the expense of the latching mechanism and its vulnerability to failure.

Molded in Situ Non-Metallic Jackets

It is also known to mold a non-metallic jacket directly onto a cylindrical inner member, as shown by U.S. Pat. No. 1,863,823—Barclay (rubber pipe coupling jacket—coupling has threaded outer surface), U.S. Pat. No. 3,490,526—Collett (rubber sucker rod guide), U.S. Pat. No. 3,948,575—Rosser (resin pipe protector, e.g. epoxy or urethane).

Note: Shows split mold.

Molded in situ non-metallic jackets do not have the abrasion resistance of steel sleeves.

Metal Sleeve of Two Semi-Cylindrical Parts Welded Together

Metal wear sleeves have been formed of two semi-cylindrical pieces welded together and secured about drill pipe in various ways as disclosed by the following U.S. Pat. No. 2,259,023—Clark (rubber between pipe and sleeve), U.S. Pat. No. 2,281,632—Steps (sleeve also welded to pipe), U.S. Pat. No. 2,295,873—Stone (rubber bonded between pipe and sleeves), U.S. Pat. No. 2,877,062—Hall et al (metal strips between pipe and sleeve), U.S. Pat. No. 3,360,846—Schellstede et al (circumferential weld), U.S. Pat. No. 3,667,817—Kellner (fabric reinforced resinous insert between sleeve and pipe), U.S. Pat. No. 3,697,141—Garrett (rubber insert between sleeve and pipe), supra.

A primary difficulty with welded metal sleeves is the expense of welding and the need to protect the underlying material from deterioration due to heat from the welding operation.

Snap on Split Metal Sleeve

A metal wear sleeve split at one side and stretched apart to position it about a drill pipe is shown in U.S. Pat. No. 3,499,210—Schellstede et al.

The split is then welded, causing the sleeve to engage the pipe with a shrink fit.

If a metal sleeve touches the pipe, there will be stress concentration at the ends of the sleeve when the pipe bends, tending to crack the pipe.

A construction somewhat similar to that of the above mentioned Schellstede et al patent is disclosed in U.S. Pat. No. 3,507,525—Sable, wherein a U-shaped metal member is formed around a sucker rod and welded into a sleeve, an absorbent liner inside the sleeve swelling to grip the sleeve and rod.

As mentioned before, such welded constructions are expensive and apt to damage the underlying material. The present invention does not involve any weld extending axially of the sleeve and extending radially clear through the sleeve. Therefore it is to be noted that the presence of such a weld will be apparent from the different structure and physical properties of the metal at the welded joint compared to the metal at either side of the joint.

A good discussion of the heterogeneous nature of welded joints appears in: "The Science of Engineering Materials" by Charles O. Smith published by Prentice-Hall, Inc., copyright 1977, at pages 371–379, especially page 378, FIG. 12-61.

Such heterogeneity is sharply distinguished from the circumferentially homogeneous jointless steel sleeve of the present invention. It may be added that the jointless steel sleeve of the present invention will exhibit uniform physical properties and internal stress progressing circumferentially in the sleeve, and that if the sleeve is made of an alloy or high carbon or other heat treatable steel, there will be no heat affected zone extending axially of the sleeve, such as would be the case if the sleeve were split or divided axially and welded together.

Mechanically Retained Integral Metal Sleeve

It is also known to secure an integral steel sleeve about a drill string member by various means, the member having at least one end free of upset so that the sleeve can pass thereover, as shown in U.S. Pat. No. 2,318,878—Miller (oversize steel sleeve disposed about stretched on rubber jacket and positioned by welded split end rings). Note: Jacket can turn inside sleeve.

U.S. Pat. No. 2,855,052—Wright et al (wedge rings inside steel sleeve). Note: Sleeve is split and welded if pipe is upset on both ends. U.S. Pat. No. 3,276,824—Carter (steel sleeve held in place by wedges). Note: Sleeve is secured to stabilizer mandrel to retain stabilizer sleeve. U.S. Pat. No. 3,411,337—Schellstede (two internally tapered rings drawn together by weld tension wedge against internal split wedge ring), U.S. Pat. No. 3,482,889—Cochran (stabilizer body wedged to drill collar with slips).

It may be observed at this point that a steel wedge between a steel wear sleeve and a drill pipe tube may create stress concentrations that will cause the pipe to crack.

Integral Enlargement

It is also known to employ an integral enlargement in a drill pipe inbetween the tool joint ends, as shown by U.S. Pat. No. 3,484,122—Schellstede et al., U.S. Pat. No. 3,773,359—Chance et al., U.S. Pat. No. 3,784,238—Chance et al.

The problem with integral wear belts is the initial cost of a tube large enough to provide the desired outer diameter for the wear belt plus the cost of turning down the large diameter tube to provide a pipe of the desired wall thickness, flexibility and weight.

Sleeve or Jacket Secured to Inner Tube by Cast or Molded Annulus Material

It is known to fabricate a vibration damper formed of inner and outer metal tubes bonded to rubber therebetween as shown for example by U.S. Pats. No. U.S. Pat. No. 2,212,153—Eaton et al, U.S. Pat. No. 2,033,011—Garrett, U.S. Pat. No. 3,099,918—Garrett.

These tools are not wear protectors, for when the outer tube wears down the tool must be taken out of service. The tools are usually run in compression near the lower end of the drill string, rather than in tension as in drill pipe. Note that the inner tube of a vibration dampener does not have tool joints at both ends, one tool joint being on the outer tube.

It is known to secure a pipe coupling to the adjacent ends of the two pipes of smaller outer diameter than the inner diameter of the coupling by blocking the annulus therebetween at each end and filling the annulus with fluent hardenable material through a spout at the end of the annulus, as shown by U.S. Pat. No. 2,180,695—Rembert.

The suggested materials, include asphalt, petroleum still residue, wax resin, and lead, with various fillers and admixtures. The means for blocking off the ends of the annulus prior to filling it is rope caulking. Air is vented from the annulus during filling, the air escaping through a spout at the annulus end opposite from the filler spout.

It may be noted that materials of the type referred to by Rembert are not very elastic, rather they are more plastic, in that they deform inelastically under low stress. Furthermore, except in the case of lead, they have low melting points so that they tend to become more plastic or even fluid at temperatures moderately in excess of standard condition temperature (20° C.), and become brittle at low temperatures, such as may be encountered in the Arctic, for example, or anywhere in the wintertime.

At this junction, it may also be pointed out that there is a difference between a plastic material, such as asphalt, wax, or lead, and plastic material. Plastics materials, sometimes called "plastomers", may be defined as high polymers, i.e. having a molecular weight in excess of 1000, and usually a degree at polymerization over 100, with or without cross linking, which are capable of being converted into useable products by forming, e.g. while in the liquid state or, in the plastic state, by application of pressure, e.g. in extruders or hydraulic pressures, or injection molds. The material may be plastically formable whenever it is heated, in which case it is called a thermoplastic. Alternatively, the once cured material may remain non-plastic when it is heated, in which case it is called a thermoset. Originally,, thermoset referred to a plastics material which was converted irreversibly from a plastic to rigid state by application of heat. By extension, other plastics that are cured or set irreversibly, but by chemical action rather than by heat, are also classed as thermoset, in that they are not rendered plastic by application of heat. Examples of plastics of the thermoset type are phenols, Furan, urea, melamine, akyds, polyesters, epoxy, urethane, and silicones. Some of these materials, e.g. the silicones, in the non-plastic state may have a low elastic modulus and considerable elastic elongation akin to rubber. The materials known as elastomers may be grouped with thermosets as being materials preferred for use in the invention.

A discussion of the family of plastics, including thermoplastics and thermosets and tables setting forth many of the properties of many of the plastics appears in: "Plastics Engineering Handbook" fourth edition, published by Van Nostrand Reinhold Company, edited by Joel Frados, copyright 1976, at pages 53–82.

A discussion of high polymers, including elastomers, plastics and fibers, is to be found in:

"Polymers and Resins" by Brage Golding, published by Van Nostrand Reinhold Company, copyright 1959, see especially pages 1–11 (definitions); 18–22, 62, 105–116 (properties); 157–164 (natural rubber); 242–247 (phenoplasts); 355–357 (epoxy resins); 474–488 (aliphatic dienes).

A discussion of synthetic rubbers is given in: "The New Encyclopedia Brittanica" published by "Encyclopedia Brittanica, Inc.", 15th edition, copyright 1974, Volume 15, pages 1177–1180 which refers also to the recent synthetics known as EPR and EPDM, the latter name being an acronym for ethylene-propylene diene modified, which is an ethylene-propylene terpolymer. EPDM has been used in the construction described in U.S. Pat. No. 3,697,141—Garrett (supra).

A general discussion of the fabrication of high polymers, including thermoplasts, thermosets, and elastomers, appears in the aforementioned, "The Science of Engineering Materials" at page 379.

A construction somewhat similar to that of Rembert is shown in U.S. Pat. No. 3,406,967—Hunder et al except that the coupling is split diametrally and the filling is an elastomer or synthetic resin, preferably a thermoset plastic such as an epoxy resin.

Hunder et al's construction is to be distinguished from drill pipe and wear belts in that the outer periphery of Hunder's sleeve is interrupted by axial flanges for joining the two halves together, and the sleeve has radial indentations in contact with the pipe, and the pipe itself is two pieces since the sleeve is a coupling.

U.S. Pat. No. 2,345,657—Beare discloses a method of making a spring shackle bushing of two nested metal tubes with plastic material therebetween. The tubes are held in coaxial relationship by end covers. The annulus is filled by injecting plastics under pressure through a port in the outer tube midway between its ends. A tang may be bent down over the port to close it after injection. The plastic material is rubber. After injection it is heat cured and bonded to the tubes. The covers are removed for reuse. A similar construction is shown in U.S. Pat. No. 2,864,130—Beare except the annulus is filled and air is vented through one end cover.

The use of an external, removable mold about two concentric tubes whose inter-tube annulus is filled with rubber and vulcanized under pressure is disclosed by U.S. Pat. No. 3,608,049—Travella. The mold is split transversely, not diametrically, one-half having an opening fitting closely about the inner tube until the latter is expanded by rubber injected into the annulus.

The Beare and Tovello patents show that annular rubber sandwiches are known, but such constructions are intended for use as elastomeric supports; the inner tube is not a conduit and the wall thickness of the rubber exceeds that of the tubes.

Plastics Lined Pipe

It has been the practice for a number of years to protect drill pipe against corrosion by coating its interior with plastics material. For example, the 1976–77 Edition of the Composite Catalog of Oil Field Equipment and Services, at page 4561, contains the advertisement of P A Incorporated for its pipe coating services and makes reference to a variety of coating materials wherein the base resin is vinyl, epoxy, phenolic, or epoxy-phenolic according to the intended service of the pipe.

Coatings for pipe are also discussed in: Brage Golding's book entitled, "Polymers and Resins", supra, published by Van Nostrand Reinhold Company, copyright 1959, eg. pp 636–639, 681–682, and 705–708.

Spray coating of metals with organic coatings is discussed in: "Surface Preparation and Finishes for Metals", published by McGraw Hill Book Company, edited by James A. Murphy, copyright 1971, e.g. at pp 277–282.

Spray coating with plastisols, especially vinyl dispersions, is described in: "Plastics Engineering Handbook" (supra), fourth edition, published by Van Nostrand Reinhold Company, edited by Joel Frados, copyright 1976 at page 419.

SUMMARY OF THE INVENTION

The invention is set forth in some detail in the foregoing abstract. According to the invention there is provided a drill pipe having attached about the tube thereof, e.g. midway between the tool joints at the ends thereof, an integral metal wear belt whose inner periphery fits loosely about the drill pipe tube e.g. within about ⅛ inch radially. The outer diameter of the belt preferably is about the same as or less than that of the tool joints welded to the ends of the tube. The wear sleeve is secured to the drill pipe by a high polymer material, e.g. plastics and/or elastomeric, injected under pressure into the annular clearance between the inner periphery of the sleeve and the outer periphery of the pipe. Preferably the high polymer is a thermoset plastics material, such as a phenoplast or an epoxy resin, or a phenolic-epoxy, or an elastomer, such as synthetic rubber. The polymer should be stable up to 250° to 300° F. and should have an elastic modulus of not over about 5% of that of steel and a shear strength of about 300 to 3000 psi, preferably, and should be non-conductive electrically. The polymer fills the clearance between the drill pipe tube and sleeve, and being itself an adhesive or cement, bonds to both the tube and sleeve.

Such clearance is large enough to insure that the sleeve will pass over any external weld upset at one end of the drill pipe tube prior to welding a tool joint to the tube at that end and to insure that the sleeve can then be slid along over the tube despite variations in the outer diameter of the tube within specified tolerances. The clearance should also be large enough to prevent electrolytic corrosion between the tube and sleeve and to keep the wear sleeve from creating stress concentrations in the pipe, both initially through its attachment and later when in use and the pipe flexes inside the bolt. A radial clearance range of 1/16 inch to ¼ inch is appropriate.

Preferably, both tool joints are welded to the drill pipe tube and the tube and joints interiorly plastics coated before the annular clearance between the drill pipe tube and the already slipped on wear sleeve is filled with uncured polymer. A mold is then placed about the sleeve and the uncured polymer is injected under pressure into the annular clearance. With a check valve holding the pressure in the mold, the entire drill pipe together with the mold is placed in an oven to cure simultaneously both the wear sleeve mounting polymer and the plastics internal coating of the drill pipe. Thereafter the mold is removed.

The outer surface of the drill pipe tube is prepared mechanically, e.g. by sand blasting, to remove all dirt scale and other loose material to provide a clean base metal surface suitable for making a bond with the bonding layer. The inner surface of the wear sleeve is prepared mechanically prior to assembly to interlock mechanically with the bonding layer, both with respect to axial and torsional shear. A preferred form of mechanical preparation of the inner periphery of the wear sleeve is achieved by a combination of right and left hand threading, resulting in a pattern of shoulders opposing both axial and rotational motion of the sleeve relative to the pipe.

BRIEF DESCRIPTION OF THE DRAWINGS

For a detailed description of a preferred embodiment of the invention reference will now be made to the accompanying drawings wherein.

DESCRIPTION OF PREFERRED EMBODIMENT:

(1) Drill Pipe

Figure 1:
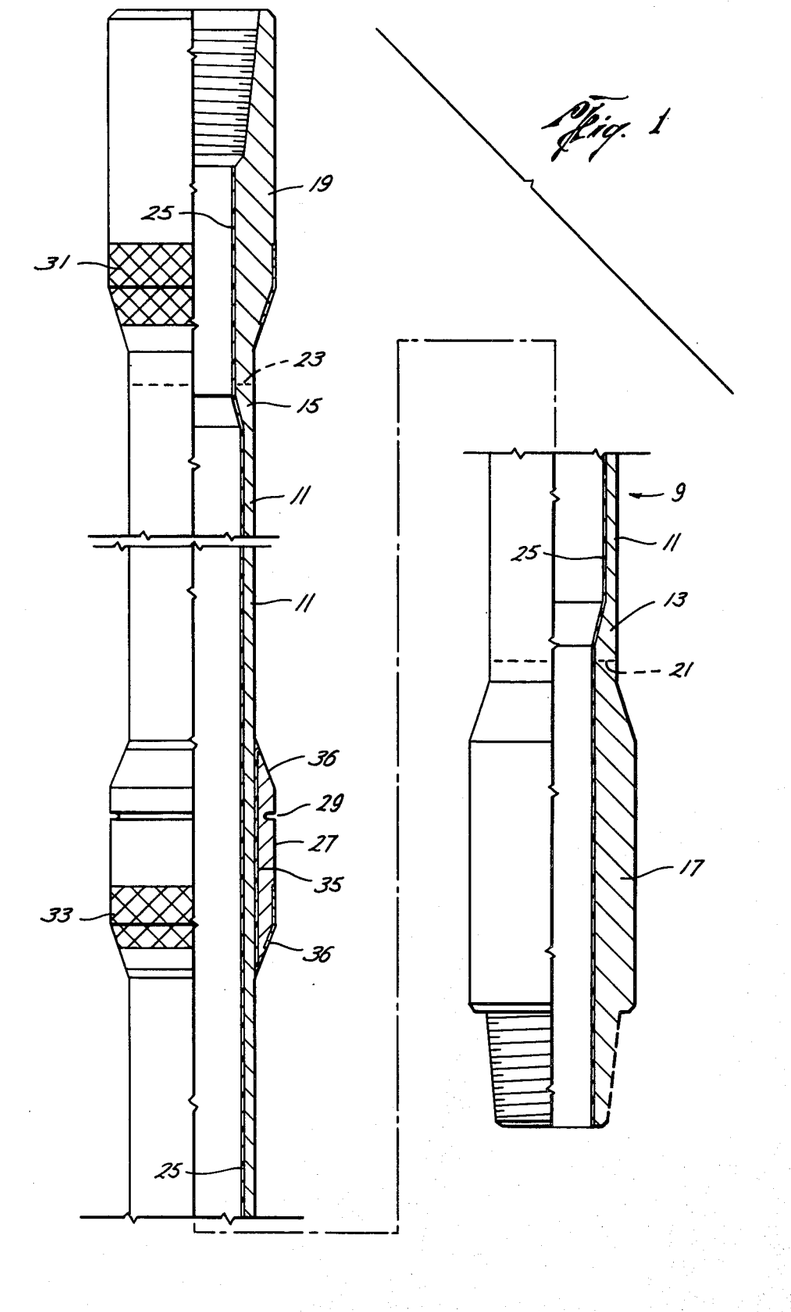
FIG. 1 is a half section through a length of drill pipe embodying the invention.

Referring now to FIG. 1, there is shown a length of drill pipe 9 including a tube 11. The ends of tube 11 are provided with weld upsets 13, 15. Usually the pipe ends are upset mostly internally with but a slight amount of external upset. To upsets 13 and 15 are welded pin and box tool joint members 17, 19. Preferably the welds are effected by flash welding or friction or inertia welding. The weld areas are indicated by the broken lines 21, 23 at the ends of upsets 13, 15. The interior of the drill pipe 9 is coated with a layer 25 of plastics material to protect the tube from corrosion and other deleterious effects of the use to which it is subjected.

Methods for applying internal plastics coating are known in the art and may involve surface preparation, e.g. by sandblasting, to clean the pipe down to the base metal, followed by spray coating or swabbing with liquid plastics, and curing at temperatures higher than normal ambient earth surface temperature to set the liquid to a solid, e.g. four hours at 400 deg. F. for an epoxy coating. For a general discussion of polymer coatings see pages 636-637 of the aforementioned, "Polymers and Resins", and the coatings sections of the other publications mentioned herein. For specific apparatus and methods see also U.S. Pat. No. 3,507,251—Thayer et al, U.S. Pat. No. 3,516,385—Walling, U.S. Pat. No. 3,525,314—McClughan and pages 215, 216; 4158, 4159 of the 1974-75 edition of the Composite Catalogue of Oilfield Equipment & Services.

Suitable plastics materials for coating the inner periphery of the drill pipe are listed at page 4561 of the 1976-77 edition of the Composite Catalogue of Oil Field and Pipe Line Equipment, mentioned above, wherein are set forth the properties of plastics coatings of various compositions and thicknesses. For the present invention, it is preferred to use an epoxy, epoxyphenolic, or phenolic synthetic resin, e.g. the materials referred to in the catalogue by the tradenames "Plasticap 200, 300, 400, or 501". It will be understood that the selection of the particular coating material will depend upon the intended service of the drill pipe, especially the temperatures of use anticipated, as indicated on the chart in the aforementioned catalog listing. Another factor in selection will be the cure temperatures and cycle which preferably should be the same as or compatible with the securement means for the wear belt, described hereinafter.

About the outer periphery of tube midway between the tool joint members is secured wear belt 27. Belt 27 is a tubular one-piece member or sleeve made of steel, as are tube 11 and the tool joint members. Belt 27 is provided, e.g. midway of its length with an annular wear indicator groove 29, which may, for example, be one half the thickness of the belt, as in the aforementioned Garrett patent. If desired, and preferably, both the wear belt and box tool joint member are provided on their outer peripheries with suitable hard facing material such as bands 31, 33, or inserts of tungsten carbide. For examples of hard facing see the aforementioned Garrett and Kellner wear belt patents and, as to tool joints, U.S. Pat. No. 2,281,632—Steps, U.S. Pat. No. 2,293,997—Neuhaus, U.S. Pat. No. 2,334,350—Neuhaus, U.S. Pat. No. 2,592,854—Boice, U.S. Pat. No. 3,054,647—Von Rosenburg.

Wear belt 27 is secured to tube 11 by mounting means comprising an annular layer 35 of an adhesive high polymer material between the belt and tube. High polymer adhesive materials are described on pages 697-705 of the aforementioned "Polymers and Resins". Not all of these are suitable for mounting layer 35 because of the other requirements, i.e. shear strength, elastic modulus and temperature stability, as set out hereinabove. Generally speaking thermoset plastics, e.g. phenolics and epoxies; and synthetic elastomers such as EPDM are suitable, as will appear from the tables of properties set forth in the referenced publications.

Figure 4:
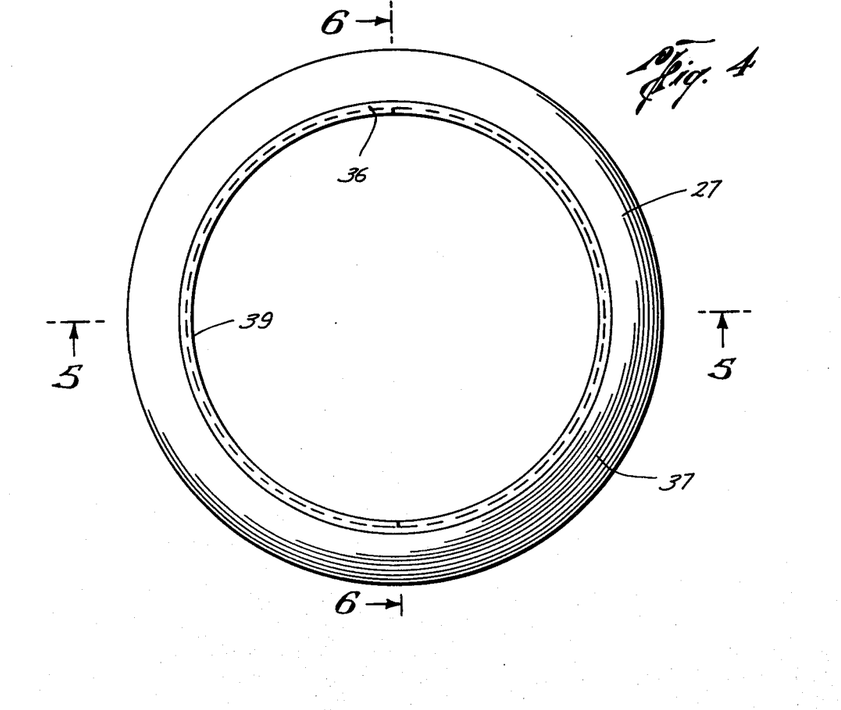
FIG. 4 is an end view of the wear sleeve alone.
Figure 5:
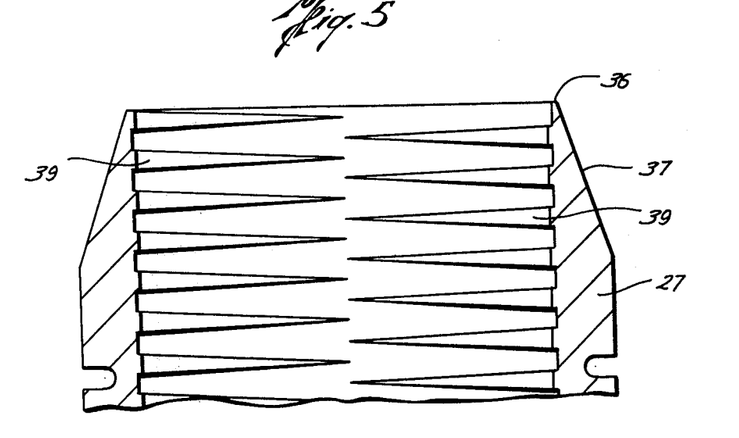
FIG. 5 is a fragmentary axial section through the wear sleeve taken on the plane indicated at 5—5 in FIG. 4, showing a preferred form of surface configuration for the inner periphery of the wear sleeve.
Figure 6:
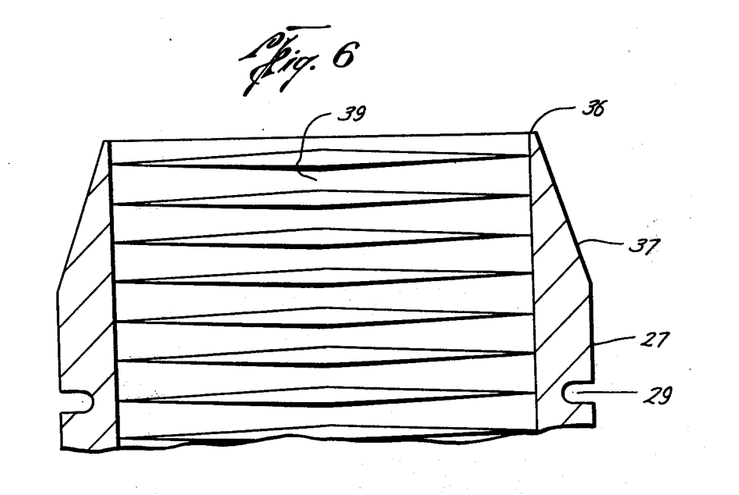
FIG. 6 is a view similar to FIG. 5 but taken in a plane at ninety degrees thereto, as indicated at 6—6 in FIG. 4.

The wear belt has conical bevels 36 around its ends 37 (see FIGS. 4-6) to ease it past protuberances from the sides of a well bore when the drill pipe is being raised or lowered. This reduces impact shear stresses on the securement layer and prevents the wear belt from being knocked loose. To this same end, the inner periphery of the wear belt is preferably roughened. For example, as shown in FIGS. 5 and 6, the inner periphery of the belt may be turned to form right and left hand coarse flat crested threads, resulting in a diamond shaped pattern of lands 39. For simplicity, the threads and resulting lands have been omitted from FIG. 1 and other figures of the drawings.

The objective in roughening the inner periphery of the belt is to provide a mechanical interlock between the belt and securement layer to supplement the adhesion of the cement. The combination of right and left hand threads not only gives resistance to axial and rotational motion of the belt about the pipe but is very inexpensive to manufacture. Other roughening patterns, e.g. as shown in the aforementioned Garrett and Kellner wear belt patents, may be employed.

The area of the outer periphery of the pipe where the wear belt is attached is also prepared prior to the securement of the wear belt thereto. The pipe is cleaned to base metal, e.g. by sand blasting, to insure that the cement layer 35 adheres to the metal of the pipe rather than dirt or scale thereon.

(2) Assembly of Drill Pipe

Figure 2:
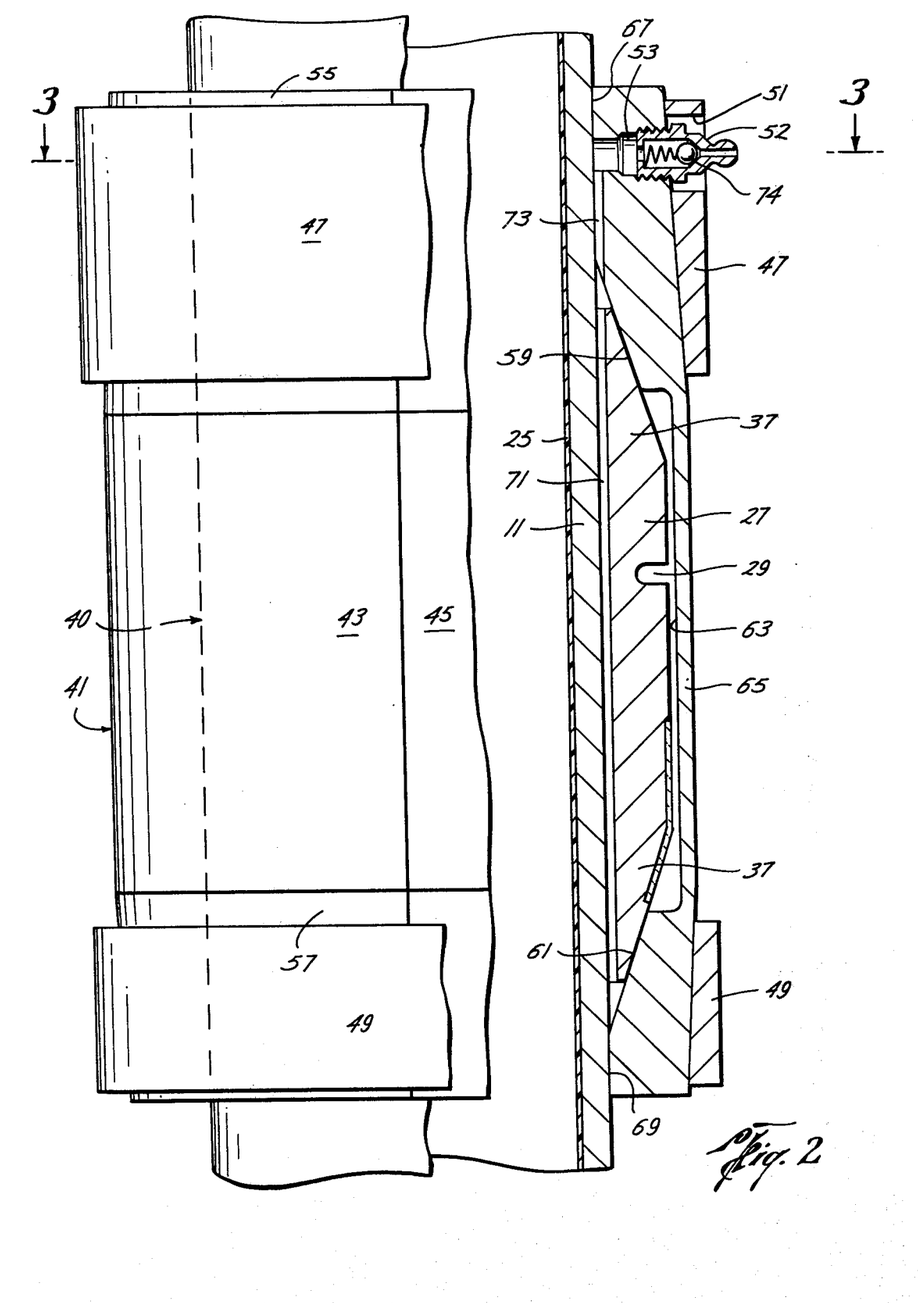
FIG. 2 is an axial half section through a portion of the tube of the drill pipe shown in FIG. 1, with a mold around the wear sleeve, representing a stage in the manufacture of the drill pipe after the plastic lining thereof and prior to introduction of plastic cement to the mold for securement of the wear belt.
Figure 3:
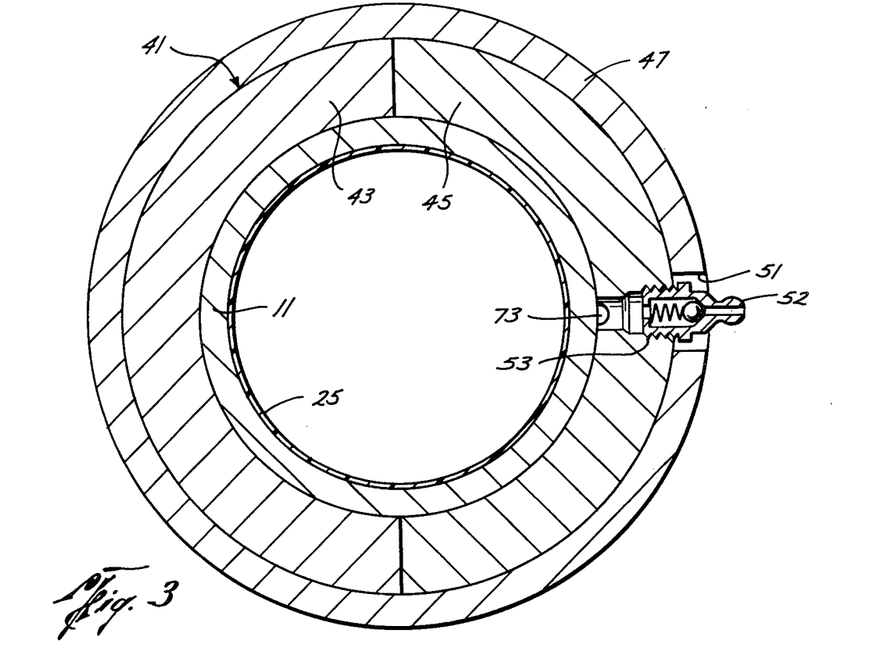
FIG. 3 is a section taken at plane 3—3 indicated in FIG. 2.

Referring now to FIGS. 2 and 3, there is shown a stage in the manufacture of the FIG. 1 drill pipe.

The one-piece, circumferentially integral, homogenous (not interrupted by welds) unitary wear belt 27 is disposed about tube 11, having been positioned about the tube at a time when at least one of the tool joint members 17, 19 has not yet been attached, the inner diameter of the belt being large enough to clear a weld upset or enlargement on the tube end but too small to pass over either tool joint member. Belt 27 is positioned about an area 40 of tube 11, which area has been previously prepared by sand blasting it clean. An annular mold 41 split diametrally into two parts 43, 45 is positioned about the wear belt and held in place by clamp rings 47, 49. A hole 51 in ring 47 at one end of the mold allows check valve controlled connector 52 to be inserted and screwed into radial inlet port 53 through which polymer material is injected into the mold. Connector 52 is to be connected to a source, not shown, of pressurized fluent, adhesive polymer material whereby such material is injected through port 53 under pressure to fill the mold cavity. FIG. 4 illustrates a stage prior to injection of the polymer.

The ends 55, 57 of mold 41 are externally conically tapered. The inner periphery of clamp rings 47, 49 are conically tapered correlative to ends 55, 57 and are drawn axially onto the mold halves tightly together. For example the rings may be driven into clamping position with a hammer.

The inner periphery of mold 41 is conically tapered at 59, 61 at the same taper angle as the ends 37, so that the mold fits snugly about the ends of the wear belt, preventing flow of polymer material therebetween when polymer is injected into the mold. The inner periphery 63 of the midportion 65 of the mold is spaced radially from the outer periphery of the wear belt. This assures that there will be no interference with the ends of the mold fitting well about the ends of the wear belt.

Beyond the tapered portions 59, 61, the inner peripheries of the ends of mold 43 are cylindrical, as shown at 67, 69, fitting closely about tube 11. Although the outer diameter of tube 11 will vary somewhat from one drill pipe to another, the clamp rings 47, 49 can draw the ends of the mold close to the tube so that there will be a minimum clearance. It is essential, that there initially be some clearance to insure that the two halves of the mold abut tightly together.

The result of the foregoing construction is that the mold cavity is filled largely by tube 11 and wear belt 27, leaving only an annulus 71 therebetween. This annulus connects with mold inlet port 53 via longitudinal passage 73.

With the parts positioned as shown in FIG. 2, an adhesive high polymer material, e.g. an epoxy, phenolic, or epoxy-phenolic similar to that used for internal coating 25 (FIG. 1), is injected under pressure, e.g. of 1000 psi, through port 53 to fill space 71. Space 71 extends out beyond the ends of the wear belt so that some cement will protrude beyond the ends of the belt.

Suitable injection molding and related equipment is described at pages 576, 579–581, 587–592 of the aforementioned, "Polymers and Resins," for greater detail, reference may also be made to several chapters of the aforementioned "Plastics Engineering Handbook", especially pages 241–252.

After the polymer is injected, the source (not shown) of pressurized fluent polymer is disconnected from connector 52 and spring biased ball check valve 74 retains the polymer material in the mold, under pressure. The polymer is then cured, e.g. by subjecting it to the required curing temperature in an oven. Preferably the curing of the polymer forming belt sucurement or mounting layer 35 (FIG. 1) is accomplished simultaneously with the curing of the internal coating 25. Such simultaneous curing can be effected even though coating 25 and mounting layer 35 are made of different plastics materials so long as the cure cycles are compatible. For example, the mounting layer 35 might be made of epoxy and the coating 25 of epoxy-phenolic. However, if desired or necessary, the wear belt mounting means can be cured separately from the internal coating of the drill pipe.

If the wear belt mounting is cured separately, an elastomer would be preferred for mounting layer 35, e.g. EPDM. Natural rubber is not a preferred elastomer because it cannot withstand the high temperatures met in deep wells and is not oil resistant. EPDM is described at pages 140–142 of "Natural Rubber and the Synthetics" by P. W. Allen published by Crosby Lockwood, copyright 1972. See also page 13 relative to EPDM a usable related material. Another possible material for the wear belt mounting layer is the plastics material forming the base for the insert used in the aforementioned Kellner patent, namely, Devcon C, and same may be warmed, formulated with hardner, positioned, and cured as therein described, except that the liquid epoxy will be injected rather than positioned with an applicator.

In any event, after the cure of the wear belt mounting means, i.e. polymer layer 35 (FIG. 1), has been effected, connector 52 is unscrewed from threaded port 53, end rings 47, 49 are removed from mold 41, and the two halves 43, 45 of the mold are removed from around wear belt 27.

Summarizing the assembly process, the wear belt sleeve is placed about the drill pipe tube before at least one of the tool joints has been welded to the tube, then all the unattached tool joints are welded to the tube, the welds are stress relieved by heating to a suitable temperature, the excess weld material is machined off, the weld areas are further heat treated, the sleeve is suitably temporarily anchored to keep it from sliding along the tube, the assembly is sent to the plastic coating area. The protective varnish dip coating on the pipe applied by the pipe mill is removed by heating the pipe to a high temperature. Then the inner periphery of the pipe is sandblasted clean and the place where the wear sleeve is to be located is similarly cleaned: The mold is then put on around the sleeve. The mounting layer is injected, the pipe is internally coated, and the whole drill pipe including wear belt is put through an oven to cure the pipe coating and wear belt mounting.

Figure 7:
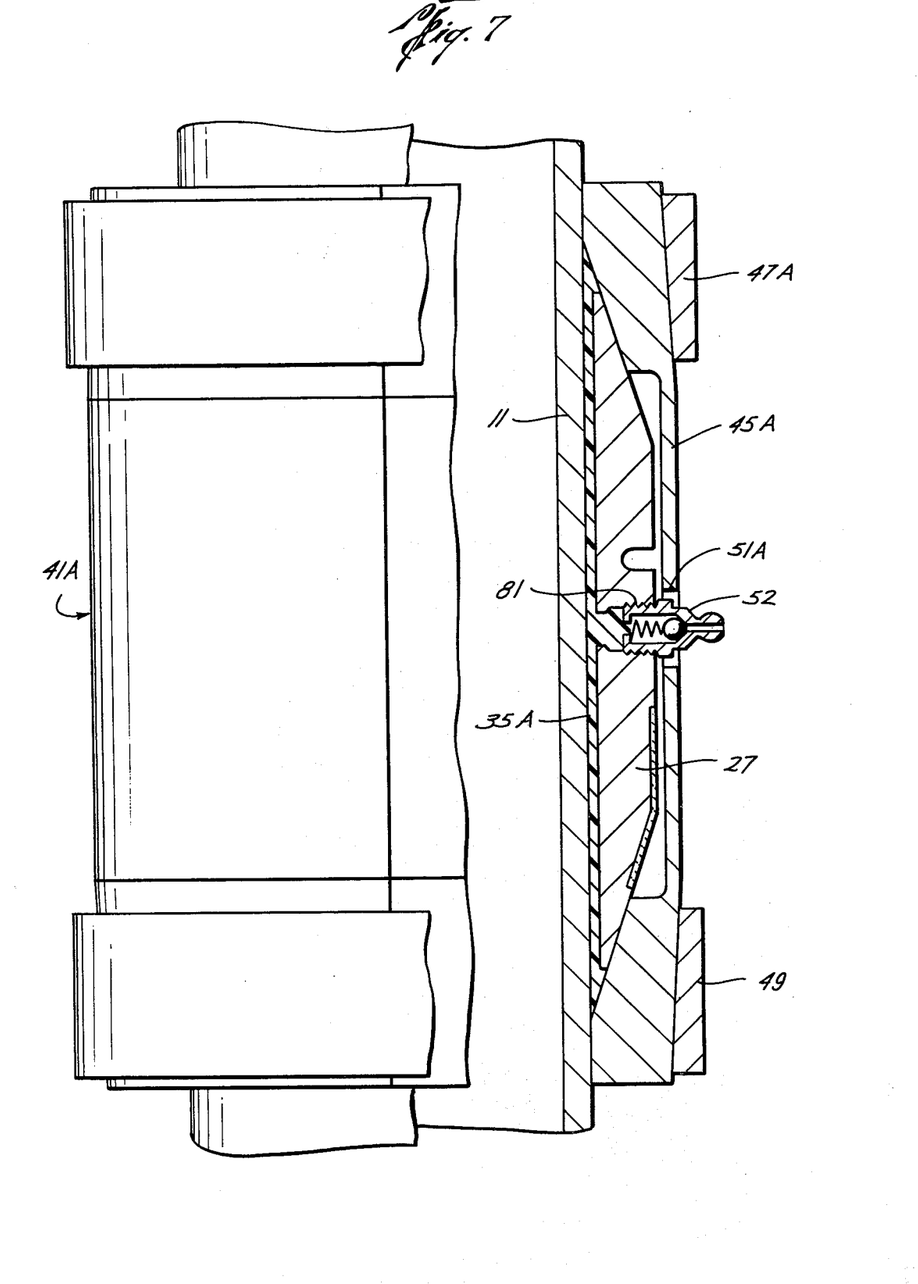
FIG. 7 is a view similar to FIG. 2 showing modifications.

Referring now to FIG. 7, instead of injecting adhesive polymer material into the mold through one end thereof, the polymer can be injected through a radial port 81 in wear belt 27 itself. The check valve controlled connector 52 is screwed into threaded port 81, being inserted through access opening 51A in mold half 45A.

Mold 41A, of FIG. 7, is shorter than mold 41 of FIG. 2, since there is no need for one end of the mold to provide an inlet for the cement. In other words, both ends of mold 41A are like the end of mold 41 shown at the bottom of FIG. 2.

In contrast to FIG. 2, FIG. 7 illustrates the construction stage after the polymer layer 35 has been injected and cured although prior to removal of the mold. If desired, after the mold 41A and injection connector 52 have been removed, port 81 in the side of the wear belt may be closed in any suitable manner, e.g. by a screw plug, as shown in FIG. 8.

Figure 8:
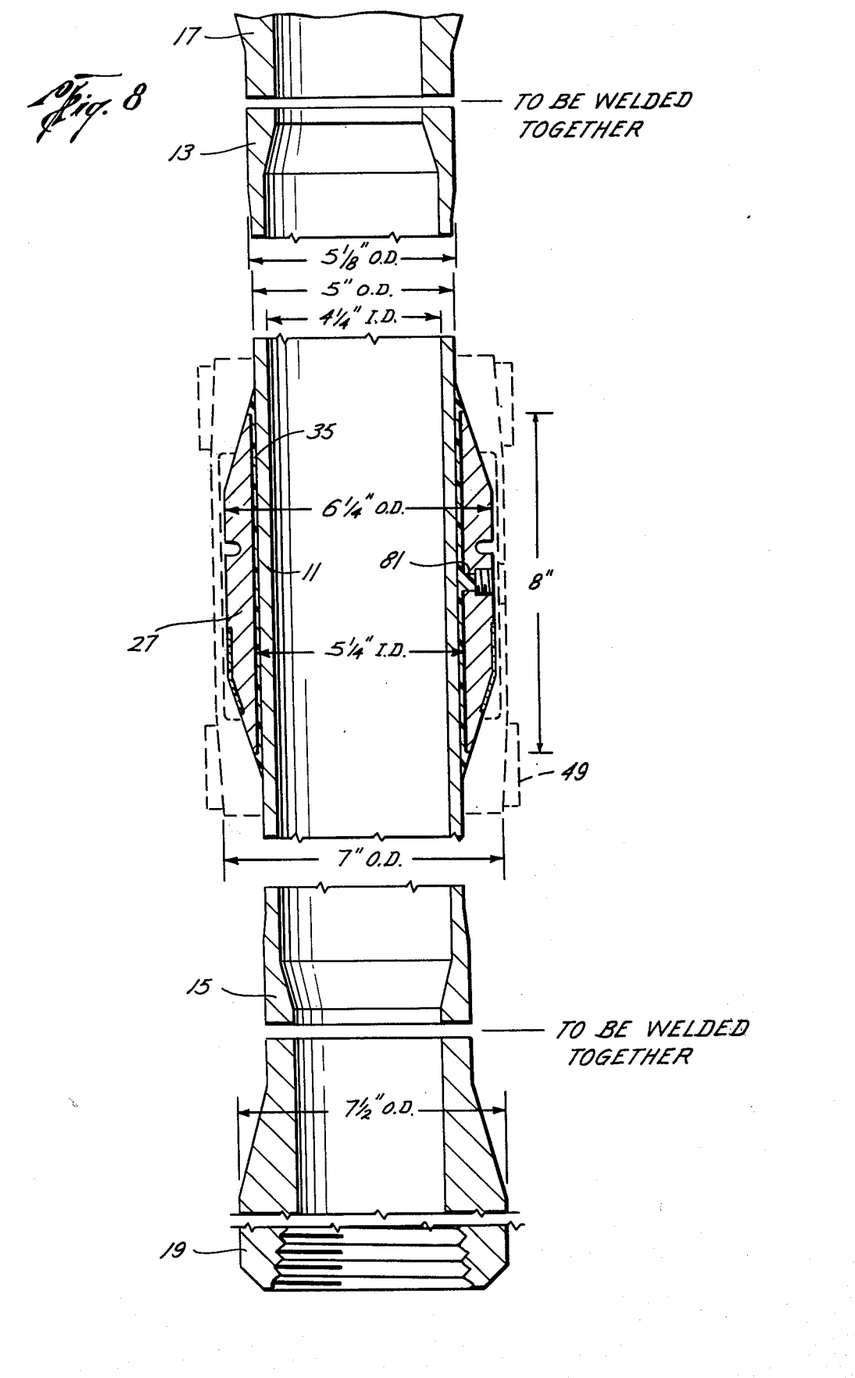
FIG. 8 is an axial section through a partially completed drill pipe showing modifications.

FIGS. 7 and 8 also illustrate that the wear belt may be secured before the drill pipe is internally coated or that such internal coating may be omitted altogether. FIG. 8 shows further that the wear belt may be secured before one or both of the tool joints is welded onto the tube portion of the drill pipe. In such case the clamp rings 47, 47A, 49 need not be large enough to pass over the tool joints, but only large enough to pass over the ends of tube 11 including any upsets or other enlargements at the end of the tube.

(3) Parameters

The thickness of the mounting layer 35 (or 35A) shown in the various figures has been shown to be about ⅛th inch. FIG. 8 gives typical dimensions for a nominal 5 inch outer diameter drill pipe tube with a slight external upset at its ends 13, 15. The outer diameter at the weld upsets is 5-⅛th inches, or 1/16th inch larger radially than the rest of the tube. The inner diameter of the wear belt 27 is 5-¼ inches, which is 1/16th inch larger radially than weld upsets, 13, 15, so that there is sufficient clearance for the belt to pass over a weld upset even if the dimensions of both are near the extremes of their tolerances. There results a thickness for the mounting layer 35 of ⅛th inch plus or minus the tolerances or variations in tube outer diameter and wear belt inner diameter. As previously mentioned, a radial thickness of the mounting layer 35 in the range of 1/16th to ¼th inch is suitable and will prevent stress concentration in the drill pipe due to attachment of the wear sleeve and to flexure of the pipe within the sleeve, and prevent electrolytic corrosion.

Typically, the wear belt will have a length of the same order of magnitude as the maximum diameter portions of each of the tool joints, typically about 4/3 the tube outer diameter, or eight inches for a 5 inch outer diameter drill pipe. In other words, the belt has a length in the range of about one to two times its outer diameter, which in FIG. 8 is shown to be 6-¼ inches, the belt thickness in the range of one to 3/2 times the pipe thickness, being shown as one-half inch. The outer diameter of the belt is about the same as that of the tool joints.

The clamp rings for the mold preferably have inner diameters large enough to pass over the outer diameter of the tool joints, the latter being exemplified in FIG. 8 as being 6-½ inches. The minor cone diameters at the ends of the mold are thus illustrated as being 7 inches.

Although the inner surface of the wear belt is shown as being provided with two opposite hand single lead threads to form a mechanical interlock with the polymer layer, opposite hand multiple lead threads could be used, e.g., quadruple lead threads, both left and right hand.

Materials from which drill pipe tube is made include steel and aluminum. Tool joints are made of high strength carbon steel. The wear belt could be made of the same material as the tool joints, but usually will be made of low carbon steel, being protected against wear by the hard metal band 33.

In order to satisfy the various considerations going into the selection of the materials for the internal plastics coating of the drill pipe and for the mounting layer high polymer for the wear sleeve, i.e., temperature stability up to 300 deg. F., resistance to wear and attach by and deterioration in drilling fluid, adhesiveness to steel drill pipe, compatible curing, strength, e.g. 300 to 3000 psi shear strength for the mounting layer, and elastic modulus of not over 5% of that of steel, it is preferred that both the pipe coating material and the wear sleeve mounting be a phenolic formulations. For a further discussion of such material see "Phenolic Resins", by A. A. K. Whitehouse, E. G. K. Pritchett, G. Barnett, published by American Elsevier Publishing Company, Inc., copyright 1967.

In an initial embodiment of the invention the assignee of this application has selected a urethane-epoxy polymer for the polymer layer between the wear belt and pipe tube.

While preferred embodiments of the invention have been shown and described, modifications thereof can be made by one skilled in the art without departing from the spirit of the invention.

I claim:

1. Method of assembling drill pipe, said pipe including a tube having tool joints of larger outer diameter than the tube welded to the ends of the tube and a wear sleeve having an inner diameter smaller than the outer diameter of said tool joints bonded about the tube between the ends of the tube, said method comprising the steps of passing the sleeve over one end of the tube and thereafter in any order welding a tool joint to that end of the tube and molding bonding material between the sleeve and tube.

2. Method of claim 1, the molding step including placement of two halves of a diametrally split annular mold about the wear sleeve to close the ends of the annular clearance between tube and sleeve and dispose the sleeve coaxial with the tube, and passing clamp rings over the ends of the tube onto the ends of the mold.

3. Method according to claim 2, wherein the molding step further includes injecting pressurized fluent bonding material into said clearance to fill same while air is vented from said clearance by leakage between the ends of the mold and the tube.

4. Method according to claim 3, wherein said fluent material is injected into said clearance through passage means in said mold communicating with said clearance.

5. Method according to claim 3, wherein said fluent material is injected into said clearance through passage means in said wear sleeve near the mid portion thereof communicating with said clearance.

6. Method according to claim 3, wherein said fluent material is injected into said clearance through passage means which thereafter is closed by closure means to maintain pressure on said fluent material and said fluent material is then heat cured while said passage means is closed.

7. Method according to claim 6, wherein said molding step further includes removal of said closure means, said clamp rings, and said mold, said clamp rings being passed back over the ends of the tube.

8. Method according to claim 1, including the further step of plastics coating the interior of the drill pipe and curing simultaneously both the plastics coating on the interior of the pipe and the bonding material between the sleeve and tube.

9. Method according to claim 2, the ends of said mold and the interior of said clamp rings being correlatively tapered, the clamp rings being driven up the tapers of the mold ends to press the ends of the mold against the tube.

10. Method according to claim 9, the tapered ends of the mold being joined by a tubular portion thin enough so that the mold ends move radially inwardly as the clamp rings are driven thereon.

11. Method according to claim 10, wherein the tubular portion of the mold is spaced radially outwardly from the wear belt, the wear belt tapers down at its ends, the inner periphery of the mold is tapered correlatively to the taper on the ends of the belt, and including sealing between the tapered ends of the belt and the tapered inner periphery of the mold as said clamp rings are driven onto the mold ends.

* * * * *

UNITED STATES PATENT AND TRADEMARK OFFICE
CERTIFICATE OF CORRECTION

PATENT NO. : 4,171,560
DATED : Oct. 23, 1979
INVENTOR(S) : WILLIAM R. GARRETT

It is certified that error appears in the above—identified patent and that said Letters Patent is hereby corrected as shown below:

Column 3, line 23: change "3,411,337" to -3,411,837-.
Column 3, line 49: delete "U.S. Pats. No.".
Column 4, line 14: change "junction" to -juncture-.
Column 4, line 16: change "plastic" to -plastics-.
Column 4, line 24: change "sures" to -ses-.
Column 5, line 14: change "2,345,657" to -2,845,657-.
Column 5, line 33: change "Tovello" to -Tavella-.
Column 5, line 35: change "eleastomeric" to -elastomeric- Column 1, line 43: change "phenoticor" to -phenolic or -.
Column 6, line 47: change "dirt" to -dirt,-.
Column 9, line 60: change "sucurement" to -securement-.
Column 10, line 15: change "hardner" to -hardener-.
Column 11, line 17: change "5/8th" to -1/8-.

Signed and Sealed this

Twenty-third Day of September 1980

[SEAL]

Attest:

SIDNEY A. DIAMOND

Attesting Officer       Commissioner of Patents and Trademarks